United States Patent [19]

Ozaki et al.

[11] Patent Number: 4,703,494
[45] Date of Patent: Oct. 27, 1987

[54] PCM SIGNAL TRANSMISSION SYSTEM

[75] Inventors: Minoru Ozaki; Kunimaro Tanaka, both of Amagasaki, Japan

[73] Assignee: Mitsubishi Denki Kabushiki Kaisha, Tokyo, Japan

[21] Appl. No.: 589,115
[22] PCT Filed: Feb. 28, 1983
[86] PCT No.: PCT/JP83/00059
§ 371 Date: Mar. 8, 1984
§ 102(e) Date: Mar. 8, 1984
[87] PCT Pub. No.: WO84/03404
PCT Pub. Date: Aug. 30, 1984
[51] Int. Cl.$^4$ ............... H04L 25/34; H04L 25/49; H04L 7/06
[52] U.S. Cl. ........................... 375/19; 375/113
[58] Field of Search ............... 375/113, 117, 20, 19; 370/48, 49; 360/44

[56] References Cited

U.S. PATENT DOCUMENTS

| | | | |
|---|---|---|---|
| 2,968,693 | 1/1961 | Gaffney et al. | 370/49 |
| 3,388,216 | 6/1968 | Brooke et al. | 370/49 |
| 3,702,900 | 11/1972 | Stürzinger | 370/48 |
| 3,828,346 | 8/1974 | Forster et al. | 375/19 |
| 4,045,614 | 8/1977 | Takahata et al. | 370/48 |
| 4,071,692 | 1/1978 | Weir et al. | 375/20 |
| 4,101,732 | 7/1978 | Suzuki | 370/48 |
| 4,298,978 | 11/1981 | Nakamura | 370/48 |

OTHER PUBLICATIONS

"A Digital Interface for the Interconnection of Professional Digital Audio Equipment", Dr. R. Lagadec, et al., 71st Convention, Mar. 2–5, 1982 Montreux, Audio Engineering Society.

Primary Examiner—Douglas W. Olms
Assistant Examiner—Wellington Chin
Attorney, Agent, or Firm—Lowe Price LeBlanc Becker & Shur

[57] ABSTRACT

In transmission of PCM signals resulting from sampling and quantizing analog signals, the PCM signals are modulated according to a desired rule of modulation and a synchronizing interval is provided for every given interval of time, the synchronizing interval being longer than a level change interval as determined by the modulation rule. The synchronizing interval is followed by a level reversal interval which is approximately equal to the longest level change interval as determined by the modulation rule.

20 Claims, 11 Drawing Figures

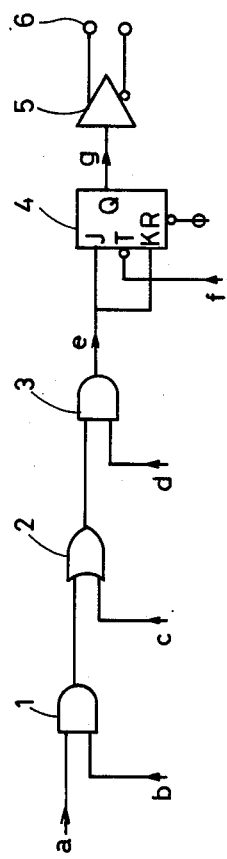
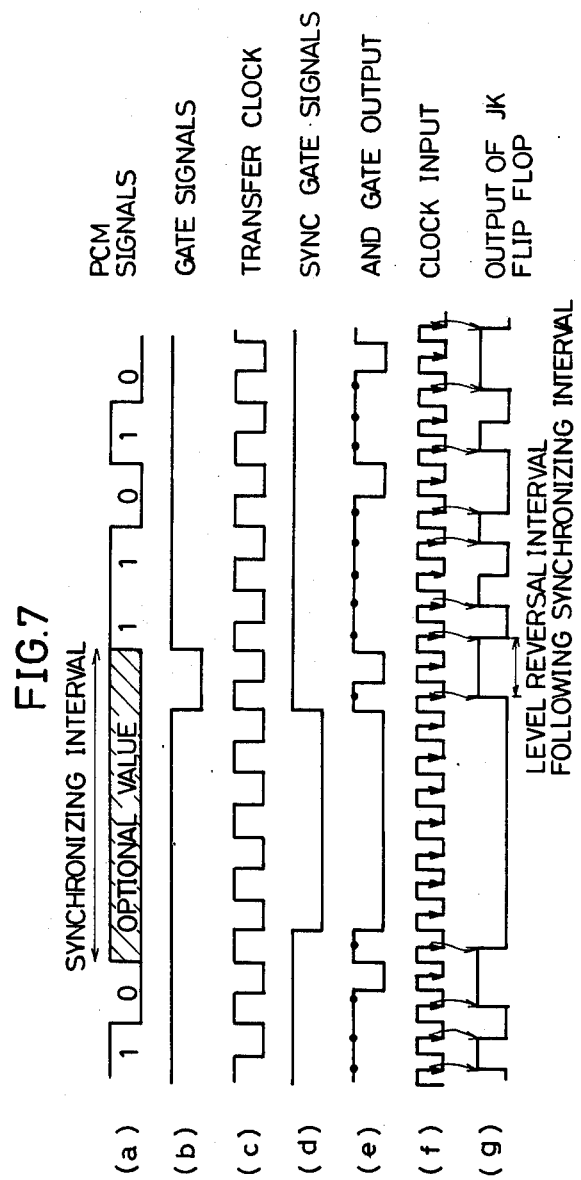

(h) RECEIVED INPUTS AFTER SHAPING
(i) EDGE SIGNALS
(j) REVERSED CLOCK
(k) OUTPUT OF FLIP FLOP(9)
(l) OUTPUT OF FLIP FLOP(10)
(m) OUTPUT OF EXCLUSIVE OR GATE(13)
(n) DEMODULATED DATA
(θ) SAMPLING CLOCK

PCM SIGNAL TRANSMISSION SYSTEM

TECHNICAL FIELD

This invention relates to a transmission system of PCM signals resulting from sampling and quantizing of analog signals.

BACKGROUND ART

In the field of signal transmission, there are generally two methods of transmission: one being that transfer clock signals and clock signals of a sampling interval are transmitted as well as data to be transmitted; and the other being that data are modulated and transmitted over a single data line. Especially, the latter is further classified into two methods: (A) a synchronizing pattern as shown in FIG. 1 is added to every data block prior to modulation and (B) a synchronizing interval which is a violation of the modulation rule as indicated in FIG. 2 is provided for every data block. The modulation rule used herein is the Bi-phase method, for example. The method (A) requires a pattern matching circuit on the demodulator side for detecting the synchronizing pattern and incurs the risk of causing an error in detection of a sampling interval in the event that a data block happens to bear the same pattern as the synchronizing patterns. In addition, the method (B) has problems of expansion of a frequency band necessary for transmission and decline of the capacity of data transmission, because of the violation of the modulation rule.

DISCLOSURE OF THE INVENTION

An object of the present invention is to provide a data transmission technique by which a synchronizing interval violating a rule of modulation is provided for each predetermined interval and a level reversal interval following each synchronizing interval is provided for every data block (or interval).

More particularly, according to the present invention, the synchronizing interval which is a violation of the modulation rule is provided for synchronizing reasons and is always followed by a level reversal interval of a desired bit length. This enables PCM signal, PCM signal transfer block signals and sampling interval clock signals to be carried over a single data line, thus assuring PCM signal transmission over a longer transmission distance without requiring a complicated and large-sized circuit structure.

BRIEF DESCRIPTION OF THE DRAWINGS

FIG. 6 is a circuit diagram of a transmitter according to the present invention;

FIG. 7 is a time chart for the transmitter;

THE BEST MODE FOR CARRYING OUT THE INVENTION

Figure 1:
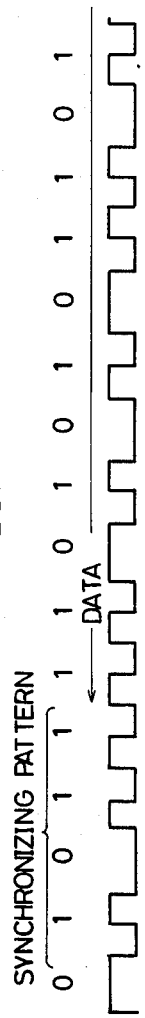
FIG. 1 is a diagram illustrating a conventional waveform of transmitted PCM signals to which a synchronizing pattern is provided for every data block as a representation of a sampling interval.
Figure 2:
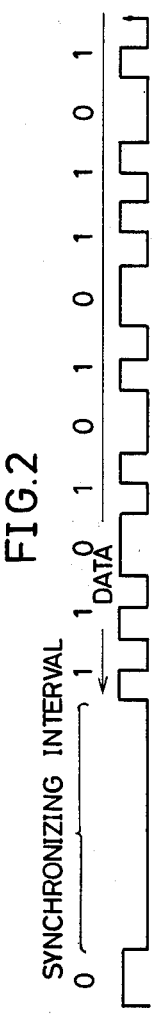
FIG. 2 is an illustration of another conventional waveform of transmitted PCM signals to which a synchronizing interval violating a rule of modulation is provided as a representation of a sampling interval.
Figure 3:
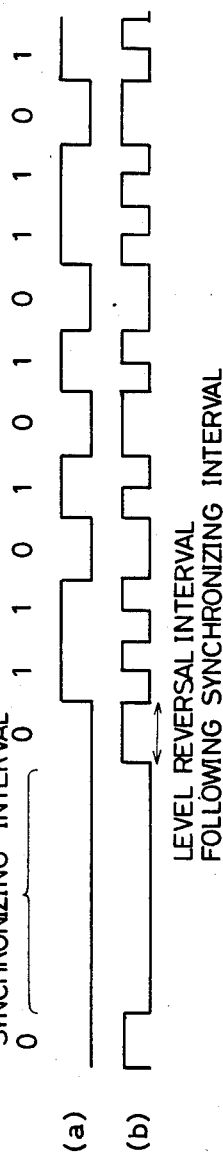
FIG. 3 is an illustration of an example of a waveform of transmitted PCM signals according to the present invention.
Figure 4:
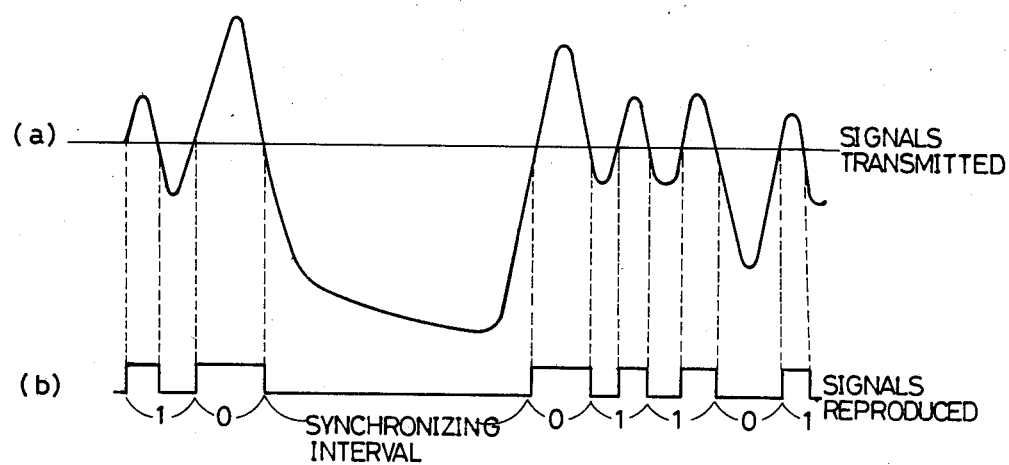
FIGS. 4 (a) and 4(b) are illustrations of waveforms of transmitted PCM signals and the demodulated signals thereof according to the present invention.
Figure 5:
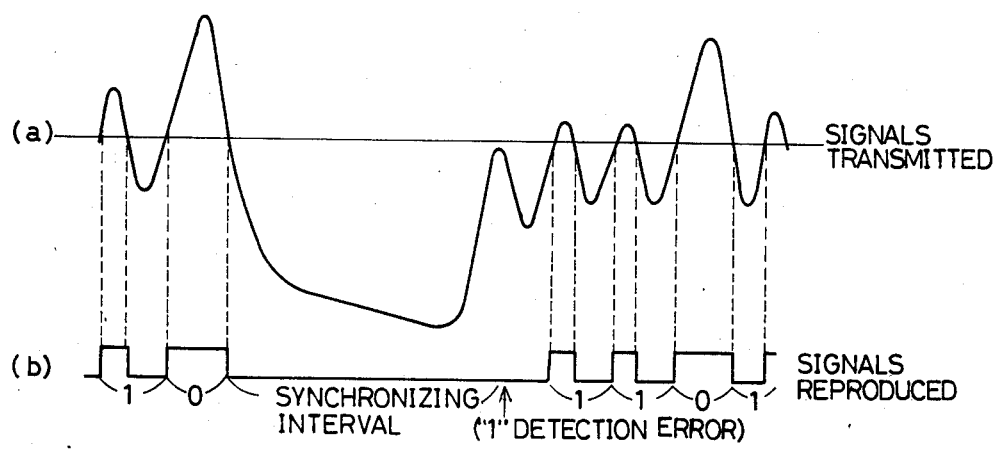
FIGS. 5(a) and 5(b) are illustrations of transmitted PCM signals and the demodulated signals thereof according to the conventional technique.
Figure 8:
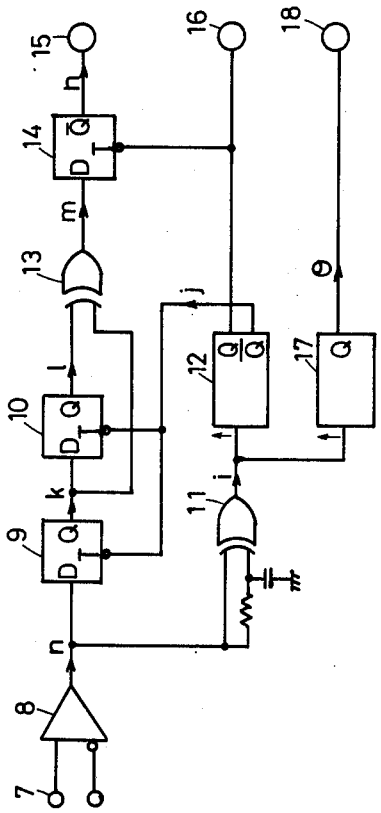
FIG. 8 is a circuit diagram of a receiver according to the present invention.
Figure 9:
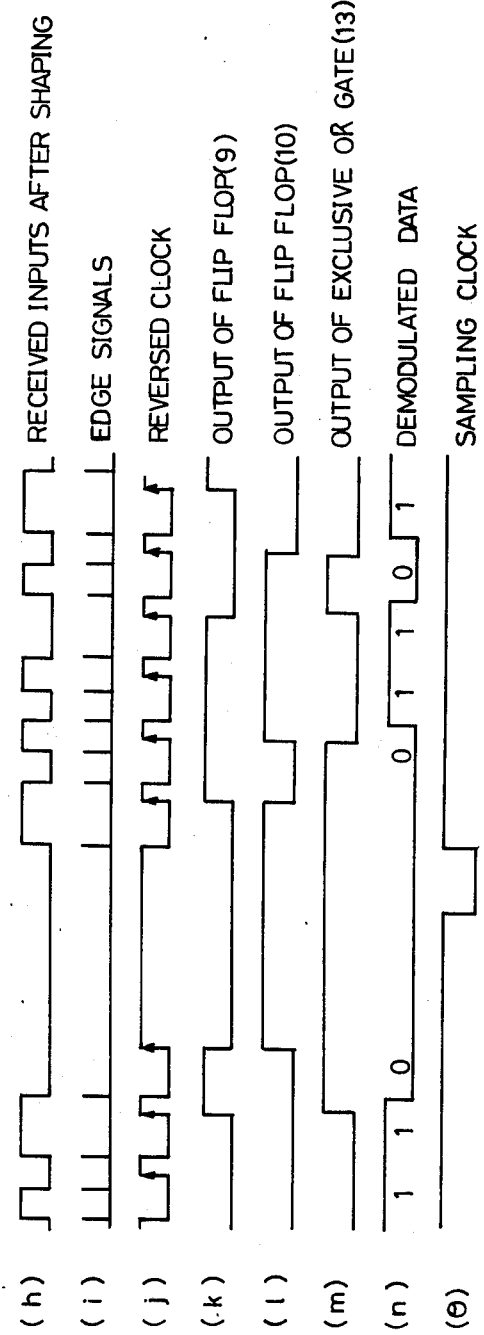
FIG. 9 is a time chart for the receiver.

In FIG. 3, there is shown a waveform of a signal transmitted according to an embodiment of the present invention. FIG. 3(a) depicts pre-modulated data in which "0" is always placed at the leading data bit position immediately following a synchronizing interval. FIG. 3(b) shows a waveform of transmitted PCM signals in which data are modulated in the Bi-phase method and the synchronizing interval (an interval where no transition occurs for 4 bit times) is set up. As is apparent from FIG. 3(b), the interval where no transition occurs for 4 bit times is immediately followed by another interval where no transition occurs for 1 bit time (called "level reversal interval"). FIGS. 4 and 5 depict actual examples of waveforms of transmitted signals. FIG. 4(a) shows a waveform chart of signals transmitted pursuant to the teachings of the present invention and FIG. 4(b) shows a waveform of the reproduced signals, while FIG. 5(a) shows a waveform chart of signal transmitted without any limitation on a bit following the synchronizing interval and FIG. 5(b) shows a waveform of signals reproduced from the signals in FIG. 5(a). In particular, it is evident from FIG. 5(b) that error occurs during reception if the bit immediately after the synchronizing interval is "1", that is if a transition occurs for 0.5 bit time. FIG. 6 shows a circuit diagram of a transmitter embodying the present invention for generating signals to be transmitted; FIG. 7 shows a time chart of the transmitter; FIG. 8 shows a circuit diagram of a receiver for receiving the signals transmitted; and FIG. 9 shows a time chart of the receiver.

The transmitter will first be discussed below. In FIG. 6, PCM signals to be transmitted as shown in FIG. 7(a) are applied to an AND gate (1) where signals are ANDed with a gate signal (FIG. 7(b)) for placing "0" into the bit position immediately after the synchronizing interval and setting up the level reversal interval according to the feature of the present invention. An output data from the AND gate (1) is ORed via an OR gate (2) with transfer clock signals as shown in FIG. 7(c) and then applied to an input to an AND gate (3) which also receives a synchronizing gate signal shown in FIG. 7(d) as another input thereof. The AND gate output (see FIG. 7(e)) from the AND gate (3) is fed to a JK flip-flop (4). A clock input to the JK flip-flop has a speed double that of the transfer clock signals, as seen from FIG. 7(f). The JK flip-flop (4) reverses its output when both the J and K inputs thereto are "1" and does not reverse the output when its J and K inputs are both "0". The output (g) (see FIG. 7(g)) of the JK flip-flop (4) is fed to a transmitter terminal (6) by way of a driver (5). The receiver will now be described. In FIG. 8, an input via a receiver terminal (7) is wave-shape by a receiver (8) as seen in FIG. 9(h). The output of the receiver (8) is applied not only to a D type flip-flop (9) but also to an exclusive OR gate (11) for producing edge signals (i) (see FIG. 9 (i)) for data received. The edge signals (i) are fed to a one-shot multivibrator (12) having a hold time of 0.75 bit length which provides transfer clock signals to a terminal (16). The reversed inverted output (see FIG. 9(j)) of the multivibrator, on the other hand, provides clock signals to the D type flip-flop (9) and to another D type flip-flop (10) for transfer of the data received (h). The outputs (l), and (k) of the D type flip-flops (9) and (10) (see FIGS. 9(l) and 9(k)) are applied to an exclusive OR gate (13) whose output (m) (see FIG. 9 (m)) is supplied to a D type flip-flop (14). The inverted output (n) of the D type flip-flop (see FIG. 9(n)) provides demodulated data as delivered from an output terminal (15). The synchronizing interval is detected by applying the edge signals (i) to a re-triggerable one-shot multivibrator (17) having a hold time of 3 bit length. The output (o) of that multivibrator (see FIG. 9 (o)) provides clock signals of a sampling interval as delivered from a terminal (18).

Although the synchronizing interval is 4 bit times long in the above embodiment, it is obvious that it may be at least 2 bit times or longer.

Figure 10:
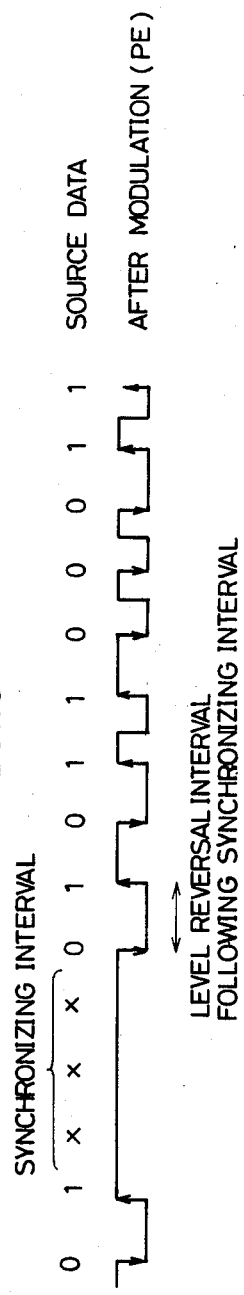
FIG. 10 is an illustration of a typical transmission signal waveform in application of the present invention to PE modulation.
Figure 11:
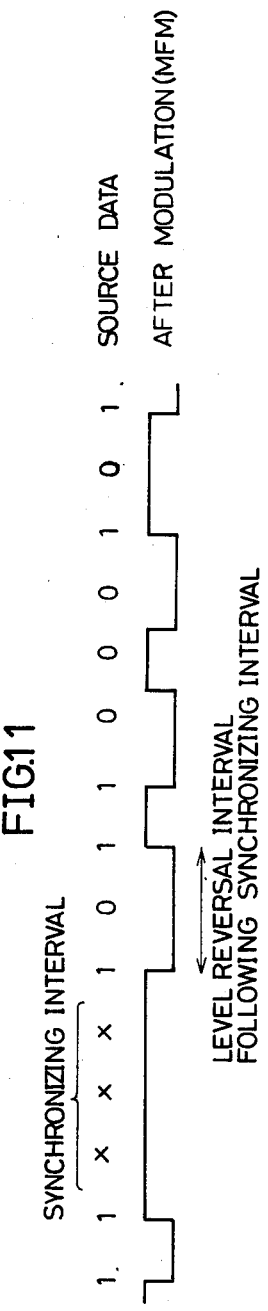
FIG. 11 is an illustration of a typical transmission signal waveform in application of the present invention to MFM modulation.

Furthermore, the Bi-phase method has been employed in the above embodiment for coding of the signals to be transmitted. The present invention should not be limited thereto and other techniques are available for the purpose of the present invention by which a level reversal interval of a given time length is always installed immediately after the synchronizing interval. In addition, modulation techniques available are PE modulation, MFM modulation, SM modulation, M$^2$FM modulation, 4/5 MNRZI modulation, 3 PM modulation and so forth. For example, FIG. 10 shows a typical waveform of transmission waveform of signals modulated by the PE modulation technique (i.e., signals should change from "LOW" to "HIGH" for the logical value "1" and change from "HIGH" to "LOW" for the logical value "0" and a level change should occur at every bit transition so as to meet the above modulation rule). In FIG. 11, there is further shown a typical transmission waveform of signals which are modulated by the MFM modulation method (level change should be "0" for the logical value "1" and level change should occur at a bit transition only when the logical value "0" lasts). It is noted that the level reversal interval immediately after the synchronizing interval is selected to be the longest interval permissible under the modulation rule, especially 1 bit length for the PE modulation and 2 bit length for the MFM modulation.

INDUSTRIAL APPLICABILITY

The present invention is useful in transmitting PCM recorded or reproduced signals to another PCM recorder or the like or transmitting PCM video signals or information between recorder/players.

What is claimed is:

1. A system for transmitting PCM signals comprising means for transmitting PCM signals modulated according to a specified rule of modulation and for providing for every given period of time in said signals a synchronizing interval violating said modulation rule, and means for including in said signals a level reversal interval following said synchronizing interval.

2. A system for transmitting PCM signals according to claim 1 wherein said transmitting means comprises means for selecting the length of said level reversal interval to be shorter than the longest level change interval determined pursuant to the specified rule of modulation.

3. A system for transmitting PCM signals according to claim 1 wherein said transmitting means comprises means for selecting the length of said level reversal interval to be equal to the longest level change interval determined pursuant to the specified rule of modulation.

4. A system for transmitting PCM signals according to claim 1 wherein said transmitting means comprises means for providing said synchronizing interval for every sampling interval.

5. A system for transmitting PCM signals According to claim 1 wherein said transmitting means comprises means for selecting said level reversal interval to be the same length as the longest level change interval as determined pursuant to said specified rule of modulation.

6. A system for transmitting PCM signals according to claim 1 wherein said transmitting means comprises means for modulating said signals in accordance with a Bi-phase modulation method and said means for including comprises means for setting a first bit of said level reversal interval at a "0" level.

7. A system for transmitting PCM signals according to claim 6 wherein said transmitting means comprises means for maintaining signals in said synchronizing interval at a constant level over a plurality of bit times.

8. A system for transmitting PCM signals according to claim 1 wherein said transmitting means comprises means for modulating said signals in accordance with a PE modulation method and said means for including comprises means for setting 2 first bits of said level reversal interval to be "01" or "10".

9. A system for transmitting PCM signals according to claim 8 wherein said transmitting means comprises means for maintaining signals in said synchronizing interval at a constant level over a plurality of said bit times and said means for setting is operable for setting 2 first bits of said level reversal interval to "01" and "10" when that level is "HIGH" and "LOW", respectively.

10. A system for transmitting PCM signals according to claim 1 wherein said transmitting means comprises means for modulating said signals in accordance with any one of a MFM modulation method, a ZM modulation method, a M$^2$FM modulation method, a 4/5 MNRZI method and a 3PM modulation method.

11. A system as recited in claim 1 wherein said means for transmitting includes modulating means for modulating said PCM signals according to said specified rule of modulation, and wherein said means for including comprises reversal means separate from said modulating means.

12. A system for transmitting PCM signals comprising means for transmitting PCM signals modulated according to a specified rule of modulation, first means for periodically generating in said signals a synchronizing interval of a first predetermined duration and violating said modulation rule, and second means for generating in said signals a level reversal interval of a second predetermined duration immediately following each said synchronizing interval.

13. A system for transmitting PCM signals according to claim 12 wherein said means for providing comprises means for transmitting a non-modulated signal of a predetermined duration within said violating synchronizing interval.

14. A system for transmitting PCM signals according to claim 12 wherein said second means for generating comprises means for selecting for said second predetermined duration the longest permissible duration conforming to the specified rule of modulation.

15. A system for transmitting PCM signals according to claim 12 wherein said means for transmitting includes clocked bistable means receiving an input signal for controlling an output signal thereof by inverting or maintaining the outputting signal in accordance with a binary value of said input signal, said first means for generatng said synchronizing interval comprising gating means receiving as inputs a synchronizing gate signal, a transfer clock signal, a gate signal for setting forth a level reversal interval subsequent to said synchronizing interval, and a PCM signal to be transmitted, and providing an output signal for input to said means for transmitting.

16. A system for transmitting PCM signals according to claim 15 wherein said bistable means comprises JK flip-flop means receiving said output signal from said first means for generating and receiving a clock input signal having a frequency twice the frequency of said transfer clock signal, and wherein said first means for generating includes logic gate means for providing an output signal representing a logic AND of said synchronizing gate signal AND said transfer clock signal OR said signal to be transmitted AND said gate signal for setting forth said level reversal interval.

17. A system for transmitting PCM signals according to claim 12 wherein said system further comprises receiving means for receiving said modulated signal and for outputting a demodulated data signal, a transfer clock signal and sampling interval clock signals.

18. A system for transmitting PCM signals according to claim 17 wherein said receiving means includes tandem connected D-type flip-flop means providing outputs to exclusive OR gate means, said exclusive OR gate means providing an output to a further D-type flip-flop means outputting said demodulated data signal, said receiving means further including edge signal deriving means for providing edge signals for received data, one shot multivibrator means for providing on one output terminal said transfer clock signal and on an inverted output terminal a clock signal for said tandem connected D-type flip-flop means, said tranfer clock signal connected to said further D-type flip-flop means for providing a clock signal thereto;

and retriggerable one shot multivibrator means receiving said edge signal and having a predetermined bit hold time for outputting said sampling interval clock signal.

19. A system as recited in claim 12 wherein said means for transmitting includes modulating means for modulating said PCM signals according to said specified rule of modulation, and wherein said second means comprises reversal means separate from said modulating means.

20. A system for transmitting PCM signal according to claim 12, wherein said second means is operable for generating said level reversal interval in a bit time immediately following each said synchronizing interval.

21. A system for transmitting PCM signals comprising modulating means for modulating a signal according to a predetermined modulating rule and a synchronizing signal generating means for generating a synchronizing signal, said synchronizing signal generating means including:
violating means for periodically generating a violation interval violating said predetermined modulating rule, and
reversal means for generating a signal level reversal interval independently of information content of said signal, said reversal means operable for generating said reversal interval immediately following said violation interval,
thereby providing a synchronizing signal having a violation interval followed by a signal level reversal interval.

* * * * *